Patented Jan. 6, 1942

2,269,186

UNITED STATES PATENT OFFICE 2,269,186

RESINOUS COMPOSITION

Gaetano F. D'Alelio, Pittsfield, Mass., assignor to General Electric Company, a corporation of New York No Drawing. Application October 7, 1938, Serial No. 233,784

1 Claim. (Cl. 260—53)

This invention relates to resinous compositions. More particularly, it relates to resinous compositions obtained by reacting an active methylene-containing body, such as formaldehyde, or a compound engendering formaldehyde, with a hydroxy benzoic ester, specifically esters of the general formula

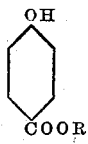

where R is an aliphatic, cyclo aliphatic or an aromatic radical.

The reaction between formaldehyde and other aldehydes with hydroxy benzoic esters is very slow unless accelerated by the addition of a suitable acid or alkaline catalyst. Hence in carrying the present invention into effect a catalyst usually is used, preferably an acidic catalyst since the resulting resin is lighter in color. With alkaline catalysts slight hydrolysis of the ester may take place. If desired, the condensation reaction may be started on the alkaline side and finished in a neutral or acid condition by adding acidic bodies to the partly reacted components.

Examples of suitable acid catalysts which may be used are sulfuric, hydrochloric, phosphoric, oxalic and chloracetic acids. Examples of suitable alkaline catalysts are the hydroxides and carbonates of the alkali metals. More specific examples of esters of hydroxy benzoic acid are the methyl, ethyl, propyl, isopropyl, butyl, amyl, phenyl, benzyl, cyclohexyl and "Cellosolve" (monomethyl ether of ethylene glycol) esters. By using ortho- or para-hydroxy benzoic esters, resins are obtained that are soluble in oil.

The oil solubility of such resins increases with the length of the carbon chain in the ester radical, resins containing less than 4 carbon atoms in the ester radical having a materially lesser oil solubility than those containing 4 carbon atoms and above. Resins of the curing type or of limited, if any, oil solubility are obtained by reacting with an aldehyde (for example, formaldehyde), esters such as meta-hydroxy benzoic esters or polyhydroxy benzoic esters, as, for instance, 2,4-dihydroxy benzoic ester.

The following examples illustrate how resinous compositions of this invention may be prepared:

Example 1

| | Parts by weight |
|---|---|
| Para-hydroxy methyl benzoate | 15.6 |
| Formalin (aqueous solution of formaldehyde containing about 37.1% HCHO) | 8.8 |
| Oxalic acid (dissolved in 1 part water) | 0.156 |

The above components were heated under reflux at boiling temperature for 20 hours, and the resulting product dehydrated under vacuum until a resinous material of the desired hardness was obtained. Dehydration may be carried out, for example, under a vacuum of 27 to 28 inches mercury and a bath temperature of 100° to 110° C.

Example 2

| | Parts by weight |
|---|---|
| Para-hydroxy ethyl benzoate | 11.7 |
| Formalin | 6.34 |
| Oxalic acid (dissolved in 1 part water) | 0.117 |

The reaction time and conditions are the same as described under Example 1. The reacted components are dehydrated by heating at atmospheric pressure between 100° and 150° C., or under vacuum as in Example 1, until a resin of the desired hardness has been obtained.

Example 3

| | Parts by weight |
|---|---|
| Para-hydroxy isopropyl benzoate | 4.7 |
| Formalin | 2.35 |
| Oxalic acid (dissolved in 1 part water) | 0.047 |

The above components were refluxed together for 10 hours, and dehydrated as under Example 2 to a hard, brittle resin.

Example 4

| | Parts by weight |
|---|---|
| Para-hydroxy butyl benzoate | 20.1 |
| Formalin | 11 |
| Oxalic acid (dissolved in 1 part water) | 0.2 |

The above components were refluxed together for 11 hours and then dehydrated, yielding a hard brittle resin.

Example 5

| | Parts by weight |
|---|---|
| Para-hydroxy amyl benzoate | 21.5 |
| Formalin | 9.1 |
| Oxalic acid (dissolved in 1 part water) | 0.215 |

The above components were refluxed together for 9 hours. The resulting mass was dehydrated, yielding a hard brittle resin.

Example 6

| | Parts by weight |
|---|---|
| Monomethyl ether of para-hydroxy glycol benzoate | 3.5 |
| Formalin | 1.6 |
| Oxalic acid (dissolved in 1 part water) | 0.035 |

The above components were refluxed together for 11 hours, thereafter being dehydrated to form a hard brittle resin.

*Example 7*

| | Parts by weight |
|---|---|
| Para-hydroxy cyclohexyl benzoate | 9.4 |
| Formalin | 4 |
| Oxalic acid (dissolved in 1 part water) | 0.094 |

The above components were refluxed together for 24 hours and then dehydrated. A hard, brittle resin resulted.

The product of each of the foregoing examples is soluble in varying degrees in fatty oils such as dry, semi-drying and non-drying oils, specifically in China wood oil, linseed oil, perilla oil, castor oil, soya bean oil, corn oil, etc., and in acids derived from such oils.

The color of the solid resin varies, depending upon the purity of all the reagents, but is especially influenced by the purity of the hydroxy benzoic esters employed. Under ordinary conditions pale yellowish resins are obtained. For maximum oil solubility ortho- or para-hydroxy benzoic esters should be used. I prefer to use para-hydroxy benzoic esters because of the lighter color of the resins which, in general, result from the use of such esters.

Any of the oil-soluble resinous materials produced in accordance with this invention may be made into liquid coating compositions by dissolving the resin in a suitable oil. Driers, pigments and other conventional ingredients of surface coating materials may be added as desired or as conditions may require. Volatile solvents are added to produce a coating composition of the desired viscosity.

Those resins of the invention which are of the curing type may be made into molding compositions in accordance with conventional practice.

What I claim as new and desire to secure by Letters Patent of the United States, is:

A method of preparing an oil-soluble resinous composition by refluxing para-hydroxy amyl benzoate and formalin containing 37.1 per cent formaldehyde in a ratio of the order of, by weight, 21.5 parts of the former to 9.1 parts of the latter in the presence of a small amount of oxalic acid and dehydrating the resulting mass.

GAETANO F. D'ALELIO.